(12) United States Patent
Ishizaki

(10) Patent No.: US 9,979,250 B2
(45) Date of Patent: May 22, 2018

(54) STATOR AND MOTOR

(71) Applicant: DAIKIN INDUSTRIES, LTD., Osaka-shi, Osaka (JP)

(72) Inventor: Akinobu Ishizaki, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days. days.

(21) Appl. No.: 15/526,689

(22) PCT Filed: Oct. 9, 2015

(86) PCT No.: PCT/JP2015/078735
§ 371 (c)(1),
(2) Date: May 12, 2017

(87) PCT Pub. No.: WO2016/076044
PCT Pub. Date: May 19, 2016

(65) Prior Publication Data
US 2017/0317549 A1 Nov. 2, 2017

(30) Foreign Application Priority Data
Nov. 14, 2014 (JP) ................................. 2014-232053

(51) Int. Cl.
*H02K 3/28* (2006.01)
*H02K 3/38* (2006.01)
*H02K 3/18* (2006.01)
*H02K 15/00* (2006.01)
*H02K 15/095* (2006.01)

(52) U.S. Cl.
CPC ................ *H02K 3/38* (2013.01); *H02K 3/18* (2013.01); *H02K 3/28* (2013.01); *H02K 15/0068* (2013.01); *H02K 15/095* (2013.01)

(58) Field of Classification Search
CPC .. H02K 3/38; H02K 3/28; H02K 3/32; H02K 3/34; H02K 3/345
USPC ................................................. 310/194, 208
See application file for complete search history.

(56) References Cited

U.S. PATENT DOCUMENTS

2006/0006758 A1    1/2006  Yamada

FOREIGN PATENT DOCUMENTS

| JP | 11-122854 A | 4/1999 |
| JP | 2000-324741 A | 11/2000 |
| JP | 2001-314055 A | 11/2001 |
| JP | 2009-118636 A | 5/2009 |
| JP | 2009-247038 A | 10/2009 |
| JP | 2011-91885 A | 5/2011 |

(Continued)

OTHER PUBLICATIONS

International Preliminary Report of corresponding PCT Application No. PCT/JP2015/078735 dated May 26, 2017.

(Continued)

*Primary Examiner* — Terrance Kenerly
(74) *Attorney, Agent, or Firm* — Global IP Counselors, LLP

(57) ABSTRACT

A stator includes a stator core and an insulator installed on an axial-direction end surface of the stator core. The stator core has a cylindrical part, a plurality of teeth, and a plurality of windings. The windings are wound around the teeth. Each winding has a first end and a second end. The insulator has a plurality winding grooves to support the second ends. Each winding groove has a first space and a second space. The first space includes an opening. The second space includes a tip part to catch the second end, and communicate with the first space via a bent part.

20 Claims, 14 Drawing Sheets

(56) References Cited

FOREIGN PATENT DOCUMENTS

| JP | 2013-258822 A | 12/2013 |
|----|---------------|---------|
| JP | 2014-11945 A  | 1/2014  |

OTHER PUBLICATIONS

International Search Report of corresponding PCT Application No. PCT/JP2015/078735 dated Nov. 24, 2015.
European Search Report of corresponding EP Application No. 15 85 8753.5 dated Feb. 13, 2018.

STATOR AND MOTOR

CROSS-REFERENCE TO RELATED APPLICATIONS

This U.S. National stage application claims priority under 35 U.S.C. § 119(a) to Japanese Patent Application No. 2014-232053, filed in Japan on Nov. 14, 2014, the entire contents of which are hereby incorporated herein by reference.

TECHNICAL HELD

The present invention relates to a stator, and to a motor provided with the same.

BACKGROUND ART

In the prior art, in order to improve motor efficiency, methods of improving the space factor of windings wound about the teeth of a stator have been used. For example, a method has been used in which the windings are wound simultaneously around all the teeth of the stator. In this method, when the windings are wound around all of the teeth to form coils, a state results in which the winding starting end and the winding finishing end of each winding are protruding from the coil. Thereafter, it is necessary to accurately connect both ends of all the windings. However, when the number of both ends of the windings is large, erroneous connections are likely to occur, and there is the risk that the efficiency of motor manufacture may be lowered.

In order to prevent the incidence of erroneous connections of windings at the time of motor manufacture, Japanese Laid-open Patent Publication No, 2001-314055 discloses a method of using an insulator having grooves to temporarily support the ends of windings during connection. In this method, protrusions of elastic bodies are installed in the grooves of the insulator, and the windings inserted into the grooves are prevented from coining loose.

SUMMARY

Technical Problem

However, in Japanese Laid-open Patent Publication No. 2001-314055, the insulator grooves are formed according to the diameters of the windings, and therefore if the winding diameters are changed, there is the risk that the windings cannot be inserted into the grooves, and the risk that the windings may easily come loose from the grooves. Hence an insulator must be used that has grooves corresponding to the diameters of the windings. Therefore, when using this method, there is the risk that the incidence of erroneous connections cannot be prevented, depending on the diameters of the windings.

An object of the present invention is to provide a stator that enables easy identification of the winding starting ends and winding finishing ends of windings wound around teeth and that makes it possible to prevent erroneous connections, and to provide a motor provided with the stator.

Solution to Problem

A stator according to a first aspect of the present invention is provided with a stator core and an insulator installed on an axial-direction end surface of the stator core. The stator core has a cylindrical part, a plurality of teeth, and a plurality of windings. The plurality of teeth protrude from the inner circumferential surface of the cylindrical part toward the radially inner side of the cylindrical part, and are disposed along the circumferential direction of the cylindrical part. The plurality of windings are wound around each of the teeth. The winding has a first end which is a winding start part around the tooth, and a second end which is a winding end part around the tooth. The insulator has a winding groove configured to support the second end. The winding groove has a first space and a second space. The first space includes an opening. The second space includes a tip part configured to catch the second end, and communicates with the first space via a bent part. The opening is formed on the axial-direction end surface of the insulator that is not in contact with the stator core.

The stator according to the first aspect is provided with the insulator having the winding grooves to support the second end of the winding. In a stator manufacturing step, the second end of the winding is caught by the winding groove and supported by the insulator. At this time, the first end of the winding is not supported by the insulator. Hence a worker who connects the first end and the second end of the winding can easily distinguish the first end, which is the end that starts winding of the winding, and the second end, which is the end that finishes winding of the winding. Consequently, in the stator manufacturing step, the occurrence of an erroneous connection can be prevented.

Further, in the stator manufacturing step, after winding the winding around the tooth, the second end of the winding can be caught on the winding groove of the insulator and secured. As a result, slackening of the second end of the winding and coming-apart of the winding from the tooth are prevented, and therefore the winding can be wound around the tooth to the farthest place inside in the radial direction of the stator core. Consequently, in the stator manufacturing step, the windings can be wound around the teeth so as to increase the winding space factor.

The stator according to a second aspect of the present invention is the stator according to the first aspect, in which the first space extends from the opening along the axial direction.

The stator according to a third aspect of the present invention is the stator according to the first aspect or the second aspect, in which the tip part is positioned on the winding direction side of the winding, relative to the bent part. The direction in which the winding is wound is the circumferential direction of the stator core.

The stator according to a fourth aspect of the present invention is the stator according to any one of the first aspect to the third aspect, in which the second space is positioned on the winding direction side of the winding, relative to the bent part. The bent part connects the first space to the second space at a bending angle of 90° or less.

In the stator of the fourth aspect, loosening of the second end of the winding and coming-apart of the winding from the tooth are prevented.

The stator according to a fifth aspect of the present invention is the stator according to any one of the first aspect to the third aspect, in which the second space further includes a return space that is positioned on the opposite side of the winding direction side of the winding, relative to the bent part.

In the stator of the fifth aspect, loosening of the second end of a winding and coming-apart of the winding from the tooth are prevented.

The stator according to a sixth aspect of the present invention is the stator according to any one of the first aspect to the fifth aspect, in which the opening is positioned between a tooth center position and an adjacent slot center position in the circumferential direction. The tooth center position is the center position in the circumferential direction of the tooth around which is wound the winding having the second end supported by the winding groove having the opening. The adjacent slot center position is the center position in the circumferential direction of an adjacent slot which is a space between the tooth in the tooth center position and the adjacent tooth thereof in the direction opposite to the winding direction of the winding.

The stator according to a seventh aspect of the present invention is the stator according to any one of the first aspect to the sixth aspect, in which the distance between the tip part and the stator core is greater than the minimum distance between the winding groove and the stator core.

In the stator according to the seventh aspect, loosening of the second end of the winding and coming-apart of the winding from the tooth are prevented.

The stator according to an eighth aspect of the present invention is the stator according to any one of the first aspect to the seventh aspect, in which the second end is connected to a neutral point.

The stator according to a ninth aspect of the present invention is the stator according to any one of the first aspect to the eighth aspect, in which the winding is wound around the tooth such that the second end exits from the radially inner side of the tooth.

A motor according to a tenth aspect is provided with the stator according to any one of the first aspect to the ninth aspect, and a rotor disposed on the inside the stator.

In the motor according to the tenth aspect, the incidence of erroneous connections in the stator manufacturing step can be prevented, and therefore a decline in motor productivity arising from winding connection defects can be suppressed. Further, in the step for manufacturing the stator of the motor, it is possible to wind the windings around the teeth such that the winding space factor increases, so that the motor efficiency can be improved. Moreover, in the step for manufacturing the stator of the motor, loosening of the second end of the winding and corning-apart of the winding from the tooth are prevented, and therefore the occurrence of manufacturing defects in the motor can be suppressed.

Advantageous Effects of Invention

The stator according to the first, second, third, sixth, eighth, or ninth aspect enables easy identification of the winding starting end and the winding finishing end of a winding wound around a tooth, and enables the incidence of erroneous connections to be prevented.

The stator according to the fourth, fifth, or seventh aspect makes it possible to prevent a winding finishing end of a winding from loosening and the winding corning apart from the tooth.

The motor according to the tenth aspect makes it possible to suppress a decline in motor productivity arising from winding connection defects, improve motor efficiency, and suppress the incidence of motor manufacturing defects.

DESCRIPTION OF EMBODIMENTS

A stator according to an embodiment of the present application, and a motor provided with the same, are described, with reference to the drawings. A motor according to the present embodiment is, for example, a drive motor of a rotary compressor that is used in air-conditioning apparatus. The rotary compressor is a compressor in which a piston is caused to rotate eccentrically inside a cylinder, and the volume of the space inside the cylinder is caused to vary, whereby a refrigerant circulating in a refrigerant circuit is compressed.

(1) Configuration of Compressor

Figure 1:
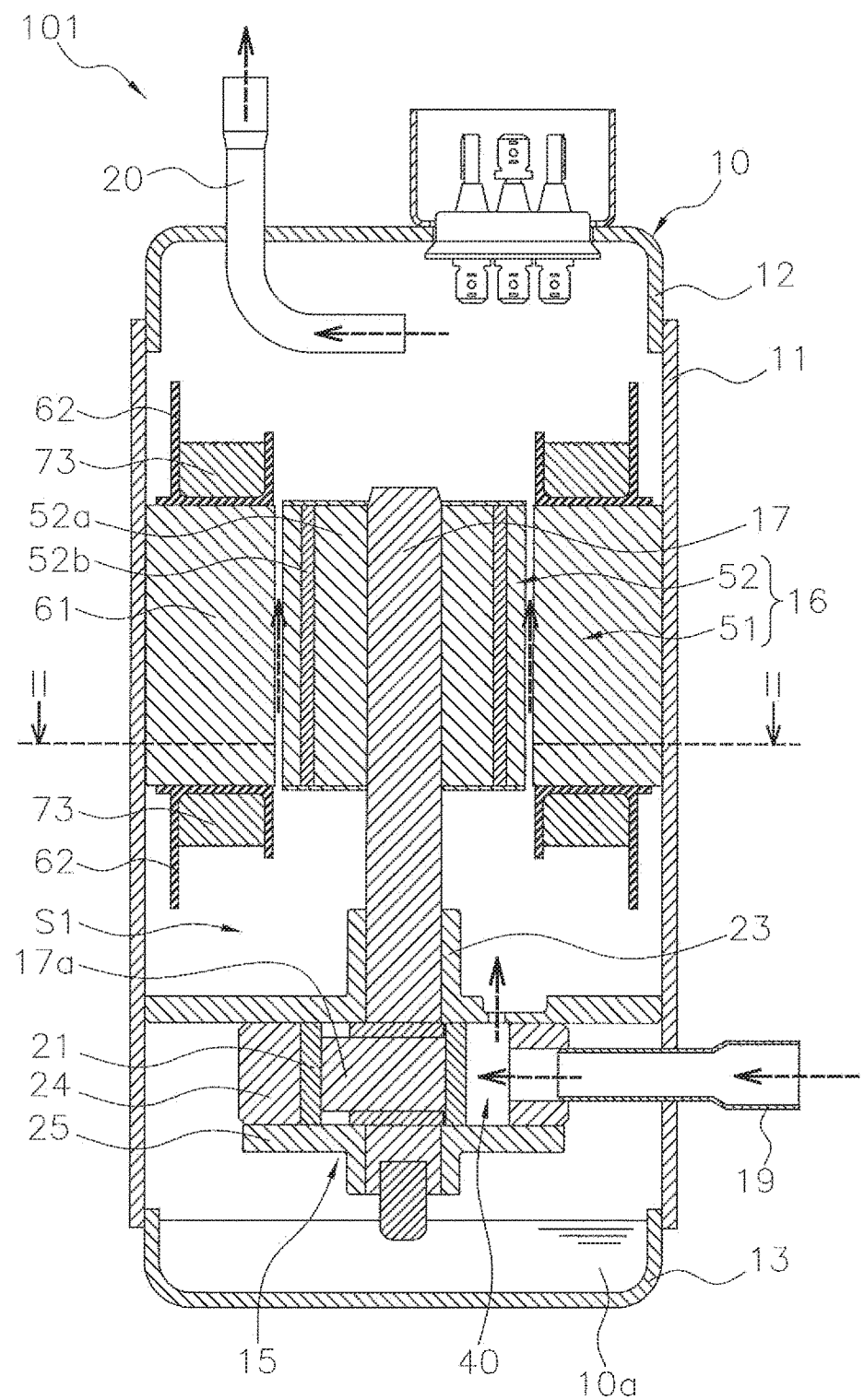
FIG. 1 is a longitudinal cross-sectional view of a rotary compressor.

FIG. 1 is a longitudinal cross-sectional view of a rotary compressor 101.

The rotary compressor 101 includes mainly a casing 10, a compression mechanism 15, a motor 16, a crankshaft 17, an intake tube 19, and a discharge tube 20. The dashed-line arrows in FIG. 1 indicate the flow of refrigerant. Each of the constitutional elements of the rotary compressor 101 is described below.

(1-1) Casing

The casing 10 has a substantially cylindrical body casing part 11, a bowl-shaped upper wall part 12 hermetically welded to an upper end part of the body casing part 11, and a bowl-shaped bottom wall part 13 hermetically welded to a lower end part of the body casing part 11. The casing 10 is shaped from a rigid member that is not readily deformed or damaged when there are changes in pressure and/or temperature inside and outside the casing 10. The casing 10 is installed so that the axial direction of the substantially cylindrical shape of the body casing part 11 extends along the vertical direction. A bottom part of the casing 10 is provided with an oil storage part 10*a* in which lubricating oil is stored. The lubricating oil is a refrigerating oil used in order to lubricate sliding parts inside the rotary compressor 101.

The casing 10 primarily accommodates the compression mechanism 15, the motor 16 disposed above the compression mechanism 15, and the crankshaft 17 disposed along the vertical direction. The compression mechanism 15 and the motor 16 are linked via the crankshaft 17. The intake tube 19 and the discharge tube 20 are hermetically joined to the casing 10.

(1-2) Compression Mechanism

The compression mechanism 15 is primarily configured from a front head 23, a cylinder 24, a rear head 25, and a piston 21. The front head 23, the cylinder 24, and the rear head 25 are integrally fastened by laser welding. The space above the compression mechanism 15 is a high-pressure space S1 into which refrigerant compressed by the compression mechanism 15 is discharged.

The compression mechanism 15 has a compression chamber 40, which is a space surrounded by the front head 23, the cylinder 24, and the rear head 25. The compression chamber 40 is partitioned by the piston 21 into an intake chamber communicating with the intake tube 19 and a discharge chamber communicating with the high-pressure space S1.

The piston 21 is fitted onto an eccentric shaft part 17*a* of the crankshaft 17. Due to axial rotation of the crankshaft 17, the piston 21 performs an orbiting motion in the compression chamber 40 about the rotational axis of the crankshaft 17. The orbiting motion of the piston 21 causes the volumes of the intake chamber and discharge chamber constituting the compression chamber 40 to vary.

(1-3) Motor

The motor 16 is a brushless DC motor accommodated inside the casing 10 and installed above the compression mechanism 15. The motor 16 is primarily configured from a stator 51 secured to an inner peripheral surface of the casing 10, and a rotor 52 rotatably accommodated on the inner side of the stator 51 with an air gap provided therebetween. The configuration of the motor 16 is described in detail later.

(1-4) Crankshaft

The crankshaft 17 is disposed such that the central axis thereof runs vertically. The crankshaft 17 has an eccentric shaft part 17*a*. The eccentric shaft part 17*a* of the crankshaft 17 is linked to the piston 21 of the compression mechanism 15. An end part on the vertical-direction upper side of the crankshaft 17 is linked to the rotor 52 of the motor 16. The crankshaft 17 is rotatably supported by the front head 23 and the rear head 25.

(1-5) Intake Tube

The intake tube 19 is a tube passing through the body casing part 11 of the casing 10. An end part of the intake tube 19 that is inside the casing 10 is fitted into the compression mechanism 15. An end part of the intake tube 19 that is outside the casing 10 is connected to a refrigerant circuit. The intake tube 19 is a tube for supplying refrigerant from the refrigerant circuit to the compression mechanism 15.

(1-6) Discharge Tube

The discharge tube 20 is a tube passing through the upper wall part 12 of the casing 10. An end part of the discharge tube 20 that is inside the casing 10 is positioned above the motor 16 in the high-pressure space S1. An end part of the discharge tube 20 that is outside the casing 10 is connected to the refrigerant circuit. The discharge tube 20 is a tube for supplying refrigerant compressed by the compression mechanism 15 to the refrigerant circuit.

(2) Configuration of Motor

Figure 2:
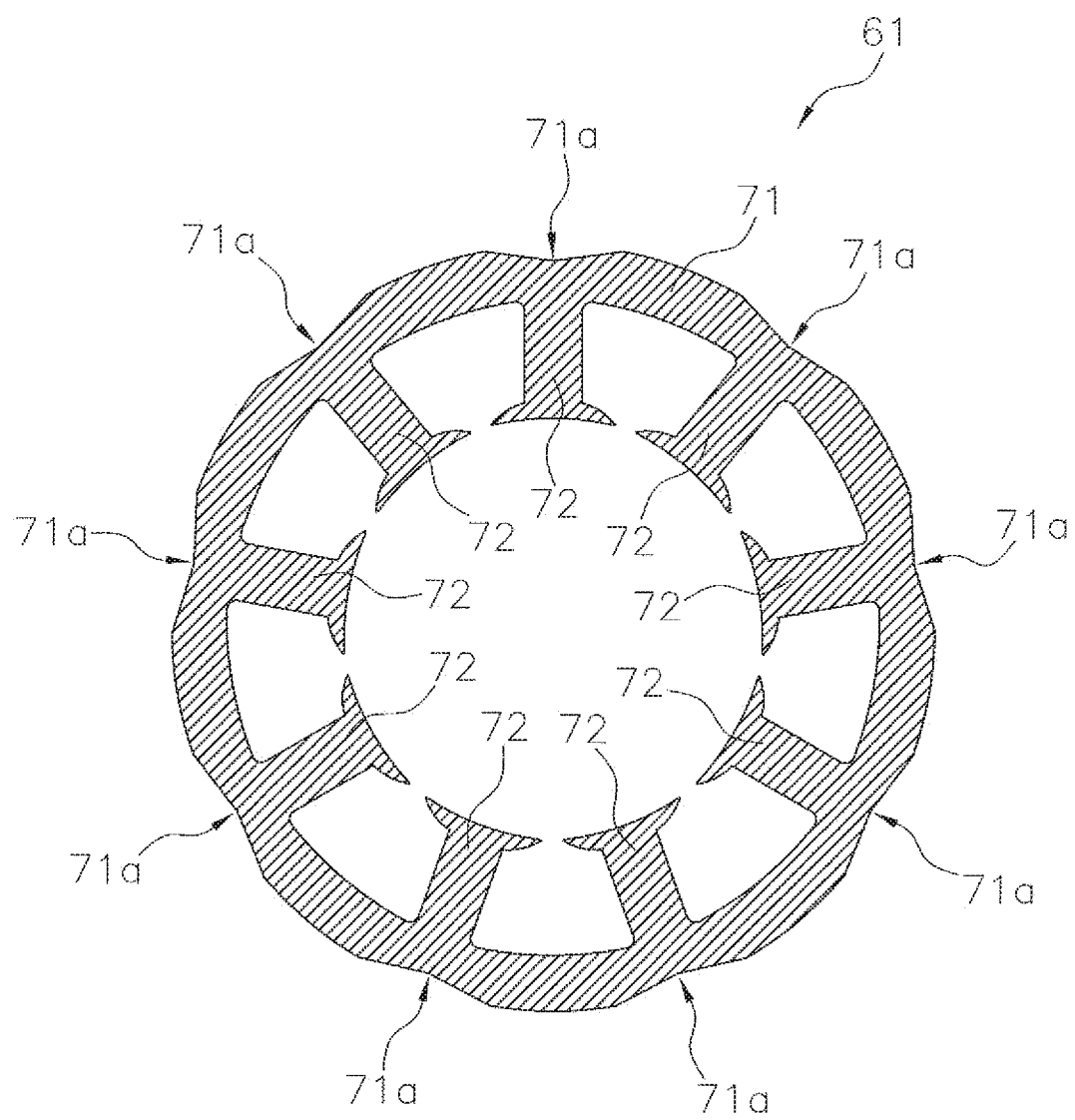
FIG. 2 is a cross-sectional view of a stator, taken along line segment in FIG. 1.
Figure 3:
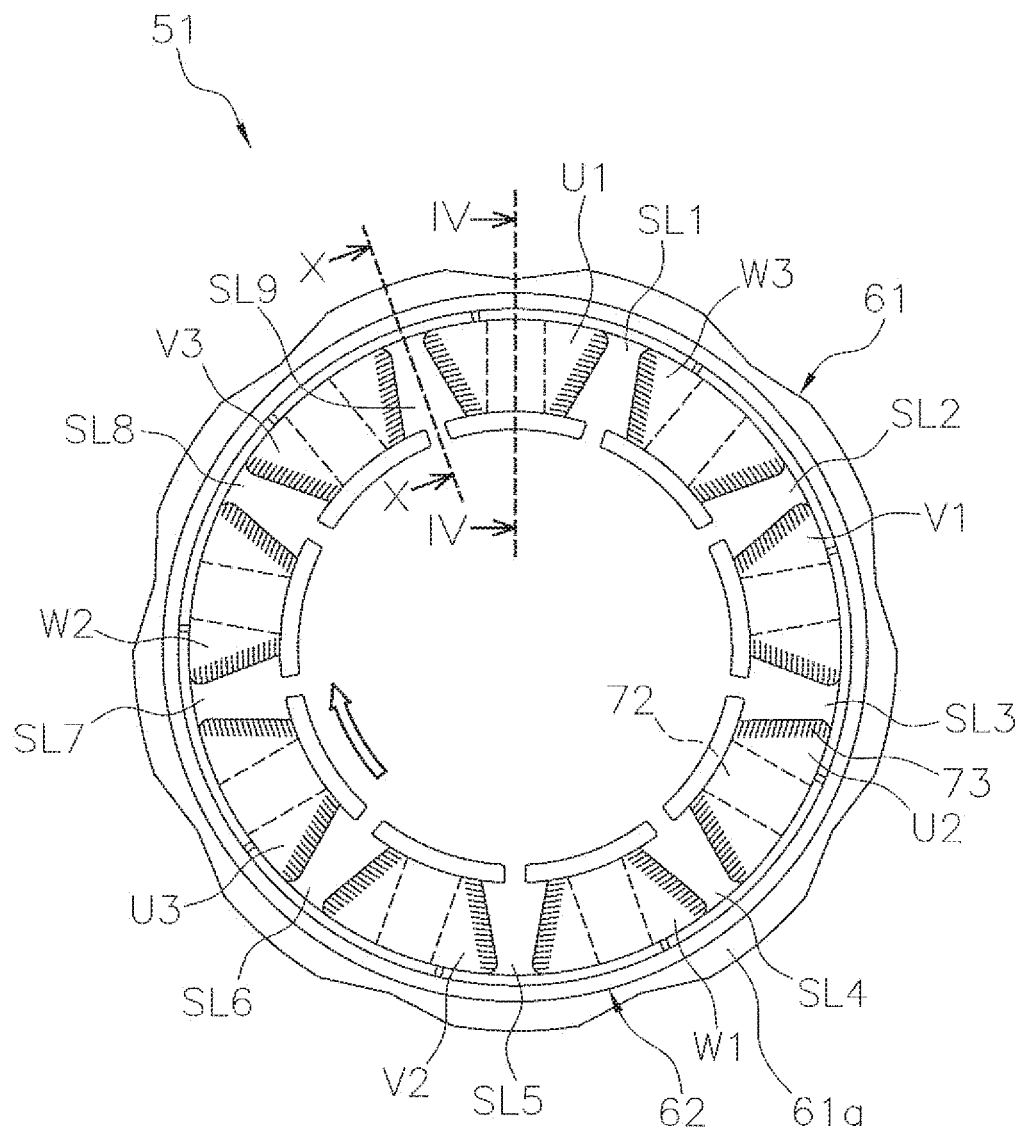
FIG. 3 is a top view of the motor.
Figure 4:
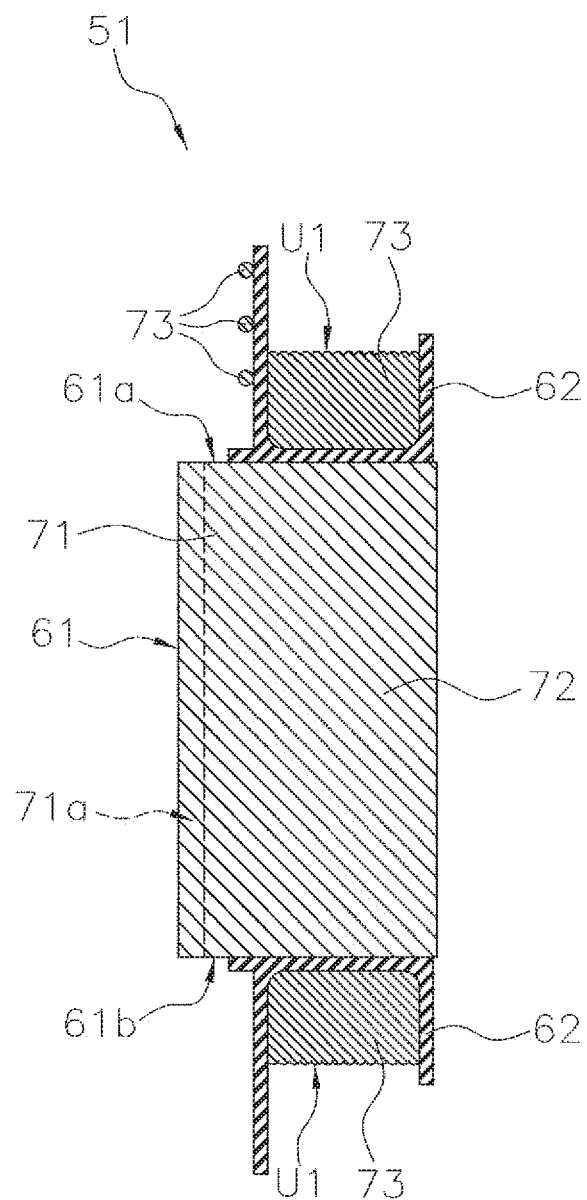
FIG. 4 is a cross-sectional view of the motor, taken along line segment IV-IV in FIG. 3.

The configuration of the motor 16 is described in detail here. FIG. 2 is a cross-sectional view of the stator 51, taken along line segment II-II in FIG. 1. FIG. 3 is a top view of the motor 16. FIG. 4 is a cross-sectional view of the motor 16, taken along line segment IV-IV in FIG. 3.

The motor 16 is a concentrated-winding motor that has nine concentrated-winding coils, and moreover is a variable-speed motor that is driven by inverter control. The motor 16 is a three-phase motor, having a U phase, a V phase, and a W phase.

(2-1) Stator

The stator 51 principally has a stator core 61 and an insulator 62. As shown in FIG. 4, the insulator 62, which is a resin insulator, is installed on an upper-end surface 61*a* and a lower-end surface 61*b* in the vertical direction of the stator core 61.

(2-1-1) Stator Core

The stator core 61 is a substantially cylindrical member in which numerous disc-shape plates, configured from electromagnetic steel, are stacked in the vertical direction. The axial direction of the substantially cylindrical shape of the stator core 61 is the vertical direction.

The stator core 61 is secured to the casing 10. Specifically, the outer peripheral surface of the stator core 61 is welded to the inner peripheral surface of the casing 10. Three weld locations are provided to each of the both vertical-direction end parts of the stator core 61. The weld locations may be suitably determined in accordance with the weight and natural frequency of the stator core 61, and other such factors. The stator core 61 may be secured to the casing 10 by press-fitting and shrink-fitting.

The stator core 61 has a cylindrical part 71, and nine teeth 72, as shown in FIG. 2. Each of the teeth 72 protrudes from the inner peripheral surface of the cylindrical part 71 radially inward from the cylindrical part 71. The radial direction of the cylindrical part 71 falls within a horizontal plane orthogonal to the vertical direction. The nine teeth 72 are disposed at positions having nine-fold symmetry about the central axis of the cylindrical part 71. That is, the nine teeth 72 are disposed at equal intervals, which are angular intervals of 40°, along the circumferential direction of the cylindrical part 71.

Nine core cuts 71*a* are formed in the outer peripheral surface of the cylindrical part 71 of e stator core 61, as shown in FIG. 2. Each of the core cuts 71*a* is a groove forming a cutout along the central axis of the cylindrical part 71, from an upper-end surface of the cylindrical part 71 to a lower-end surface of the cylindrical part 71. Each of the core cuts 71*a* is positioned radially outside the cylindrical part 71, as viewed from the teeth 72. The nine core cuts 71*a* are disposed at positions having nine-fold symmetry about the central axis of the cylindrical part 71. That is, the nine core cuts 71*a* are disposed at equal intervals, which are angular intervals of 40°, along the circumferential direction of the cylindrical part 71. The core cuts 71*a* form spaces that extend in the vertical direction between the body casing part 11 and the stator 51.

As shown in FIG. 3 and FIG. 4, a winding 73 is wound around each of the teeth 72 of the stator core 61 together with the insulator 62. As a result, nine coils U1, U2, U3; V1, V2, V3; W1, W2, W3 are formed in the stator 51, as shown in FIG. 3. In the top view of the stator 51 shown in FIG. 3, the coils U1, W3, V1, U2, W1, V2, U3, W2, V3 are disposed clockwise. The windings 73 are not wound spanning a plurality of teeth 72, and the nine windings 73 are wound independently around the respective teeth 72. That is, the nine coils U1, U2, U3; V1, V2, V3; W1, W2, W3 are concentrated-winding coils. The insulator 62 insulates the stator core 61 and the windings 73. The windings 73 are electrically conducting bodies of copper wire or the like. The windings 73 are wound in the clockwise direction in the top view of the stator 51, along the direction of the outlined arrow in FIG. 3.

The coils U1, U2, U3 are formed by winding the windings 73 around the respective teeth 72 disposed at equal angular intervals of 120° in the circumferential direction of the stator core 61. The coils V1, V2, V3 are formed by winding the windings 73 around the respective teeth 72 disposed at equal angular intervals of 120° in the circumferential direction of the stator core 61. The coils W1, W2, W3 are formed by winding the windings 73 around the respective teeth 72 disposed at equal angular intervals of 120° in the circumferential direction of the stator core 61. The coils U1, U2, U3 are connected in parallel to form the U phase of the motor 16. The coils V1, V2, V3 are connected in parallel to form the V phase of the motor 16. The coils W1, W2, W3 are connected in parallel to form the W phase of the motor 16. As shown in FIG. 3, slots SL1 to SL9, which are gaps between coils, are formed between pairs of adjacent coils U1, U2, U3; V1, V2, V3; W1, W2, W3 along the circumferential direction of the stator core 61. In the top view of the stator 51 shown in FIG. 3, the slot SL1 is the gap between the coil U1 and the coil W3, and the slots SL2 to SL9 are disposed clockwise from the slot SL1.

Figure 5:
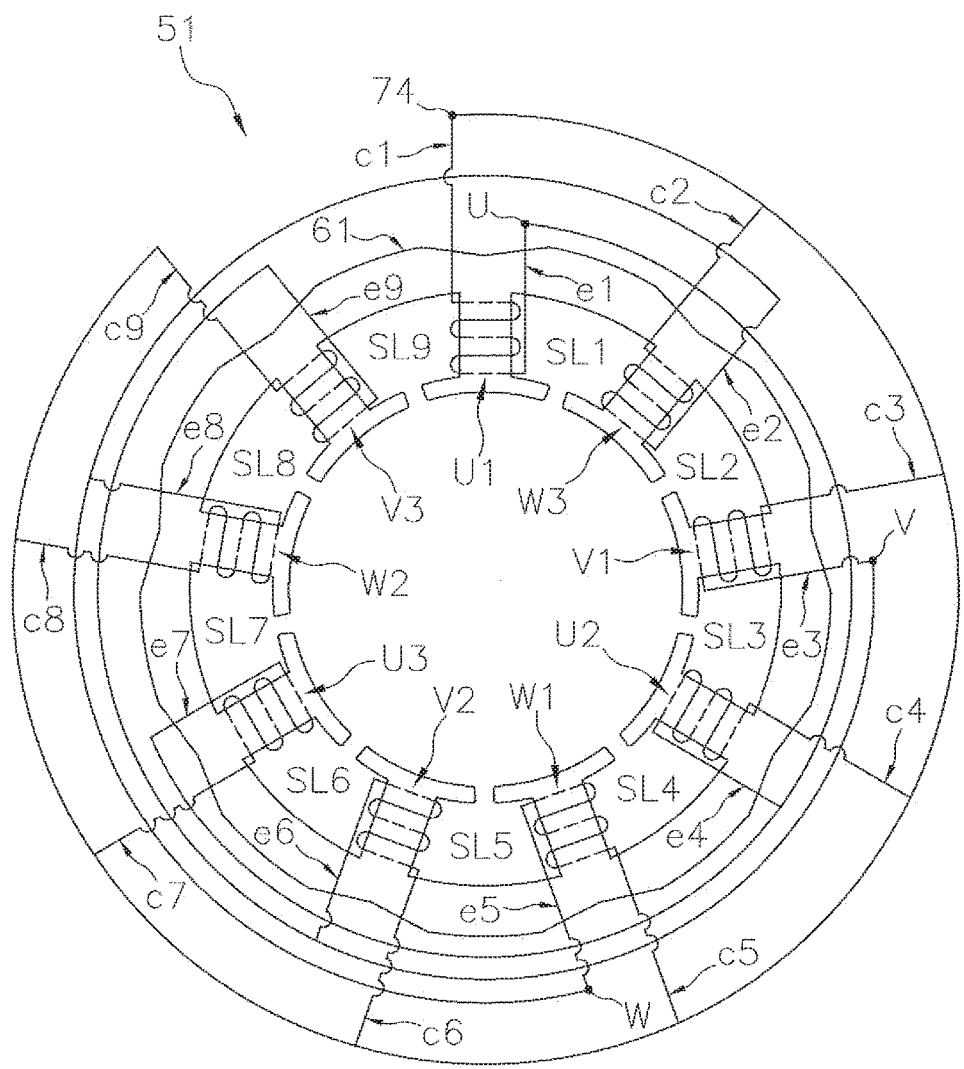
FIG. 5 shows the state of connections of windings of coils.
Figure 6:
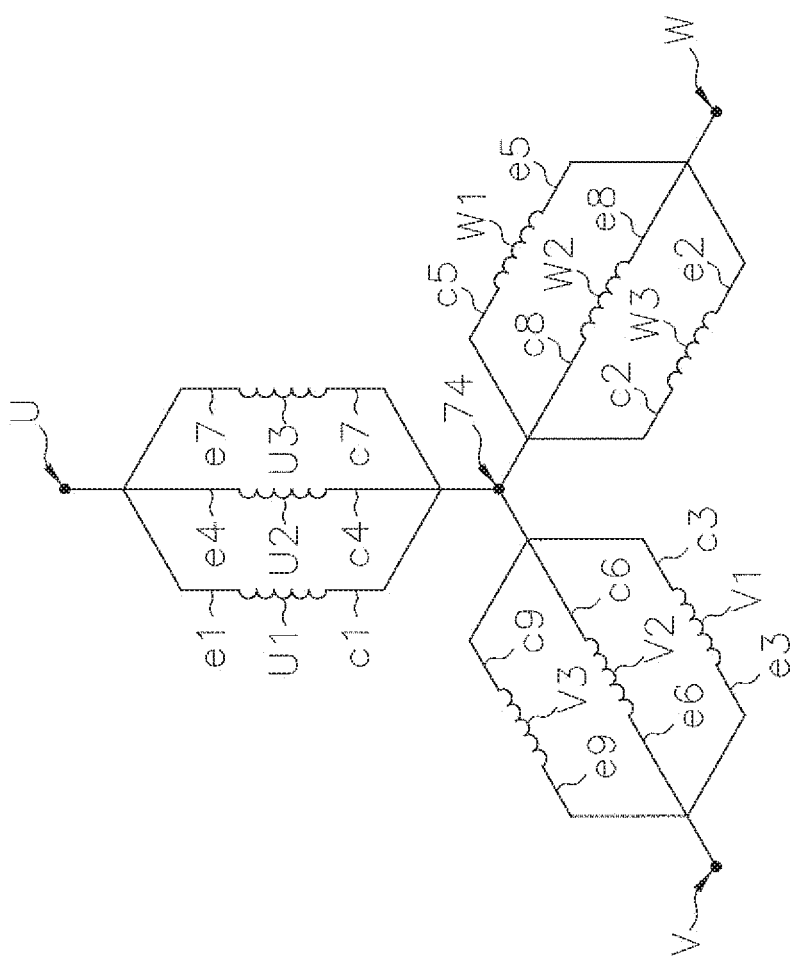
FIG. 6 is a simplified view of the state of connections of the windings of coils shown in FIG. 5.

FIG. 5 shows the state of connection of the coils U1, U2, U3; V1, V2, V3; W1, W2, W3. FIG. 5 shows a top view of the stator core 61, with the insulator 62 omitted. FIG. 6 is a simplified view of the connection state shown in FIG. 5.

Nine feeder lines e1 to e9, which are the portions that start winding of the windings 73 of the coils U1, U2, U3; V1, V2, V3; W1, W2, W3, exit from the side of the upper-end surface 61a of the stator core 61. Nine neutral lines c1 to c9, which are the portions that finish winding of the windings 73 of the coils U1, U2, U3; V1, V2, V3; W1, W2, W3, exit from the side of the upper-end surface 61a of the stator core 61.

The feeder lines e1 to e9 are winding starting portions of the windings 73. The feeder lines e1, e4, e7 extend from the windings 73 of the coils U1, U2, U3, respectively, and are connected to a feeder terminal U for the U phase. The feeder lines e3, e6, e9 extend from the windings 73 of the coils V1, V2, V3, respectively, and are connected to a feeder terminal V for the V phase. The feeder lines e5, e8, e2 extend from the windings 73 of the coils W1, W2, W3, respectively, and are connected to a feeder terminal W for the W phase. The three feeder terminals U, V, W are installed on the casing 10, and are connected to an external power supply (not shown). In each of the coils U1, U2, U3; V1, V2, V3; W1, W2, W3, the windings 73 are wound, fastened and secured, and therefore the feeder lines e1 to e9 that are the winding starting portions of the windings 73 do not loosen even if measures for securing to the stator core 61 are not taken.

The neutral lines c1 to c9 are winding finishing portions of the windings 73. The neutral lines c1, c4, c7 extend from the windings 73 of the coils U1, U2, U3, respectively, and are connected to a neutral point 74. The neutral lines c3, c6, c9 extend from the windings 73 of the coils V1, V2, V3, respectively, and are connected to the neutral point 74. The neutral lines c5, c8, c2 extend from the windings 73 of the coils W1, W2, W3, respectively, and are connected to the neutral point 74. At the neutral point 74, all of the neutral lines c1 to c9 are electrically connected. As shown in FIG. 4, the feeder lines e1 to e9 and the neutral lines c1 to c9 of the windings 73 are engaged by the insulator 62, which is installed on the upper-end surface 61a of the stator core 61 so as not to be mutually electrically connected. The neutral point 74 is covered by an insulating cap (not shown), and is inserted into any one of the slots SL1 to SL9. The insulating cap is molded from polyester film for electrical insulation or the like.

(2-1-2) Insulator

The insulator 62 is an insulating body attached to the both vertical-direction end surfaces 61a, 61b of the stator coil 61. The insulator 62 is molded from, e.g., a liquid crystal polymer (LCP), a polybutylene terephthalate (PBT), a polyphenylene sulfide (PPS), a polyimide, a polyester, or another highly heat-resistant resin.

Figure 7:
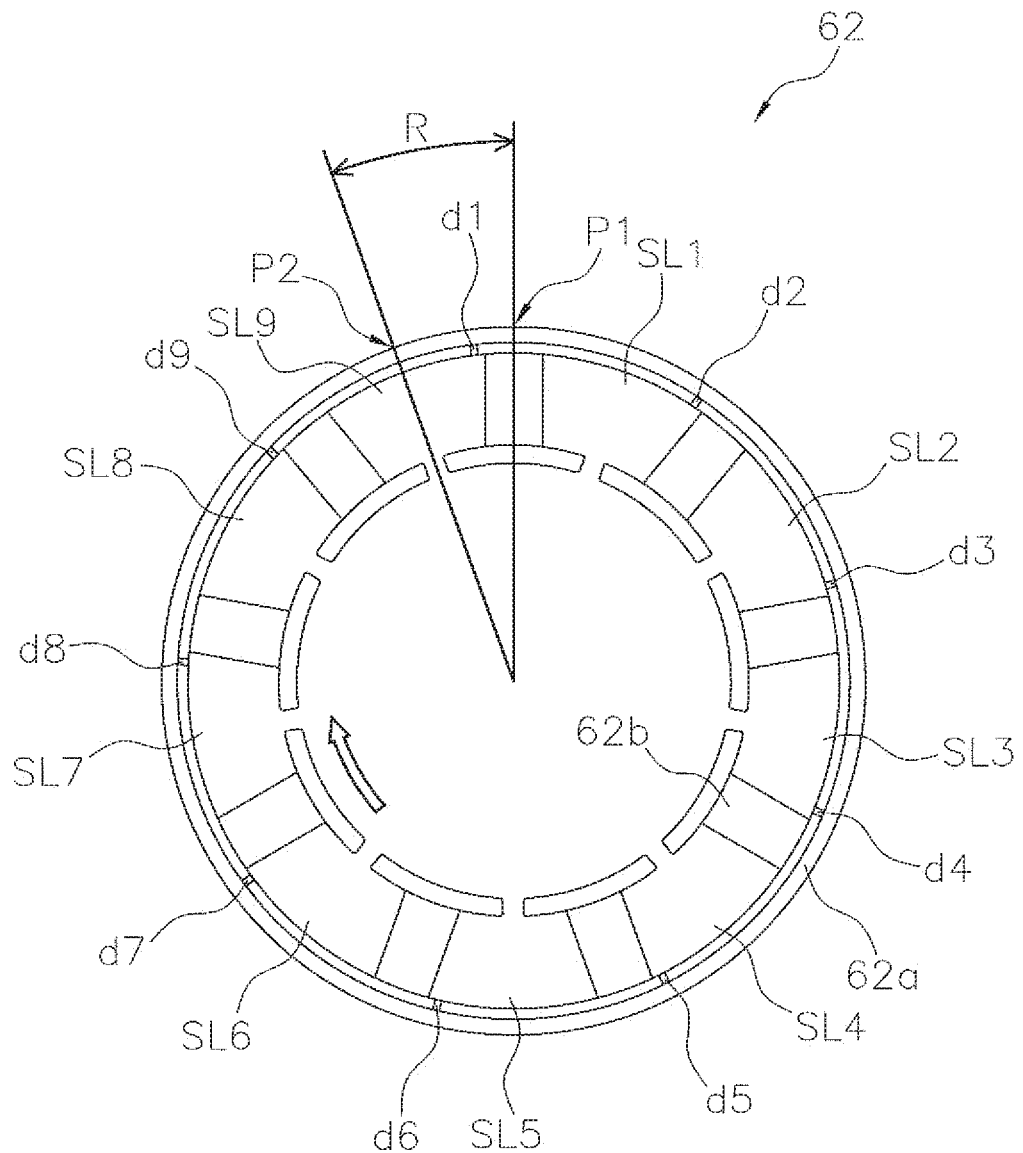
FIG. 7 is a top view of an insulator attached to the upper-end surface of a stator core.
Figure 8:
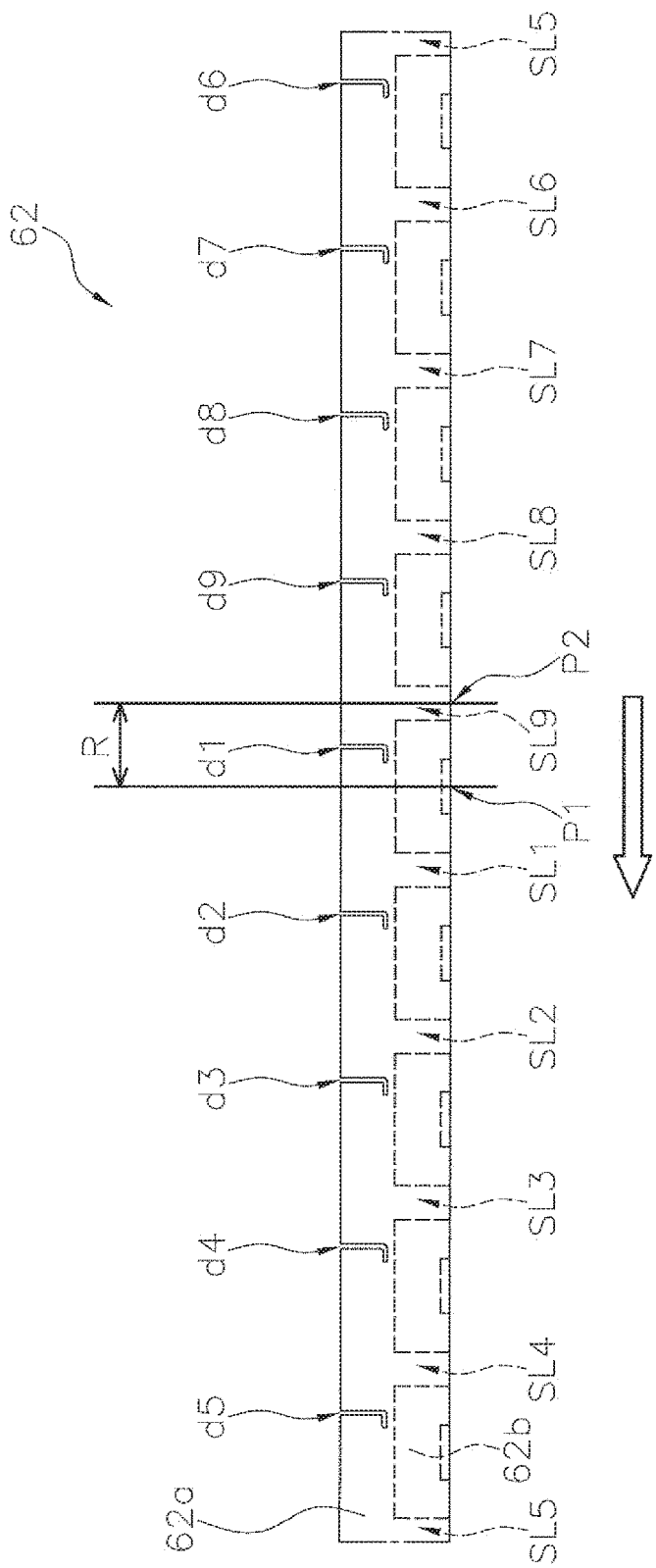
FIG. 8 is a side view of the insulator shown in FIG. 7.
Figure 9:
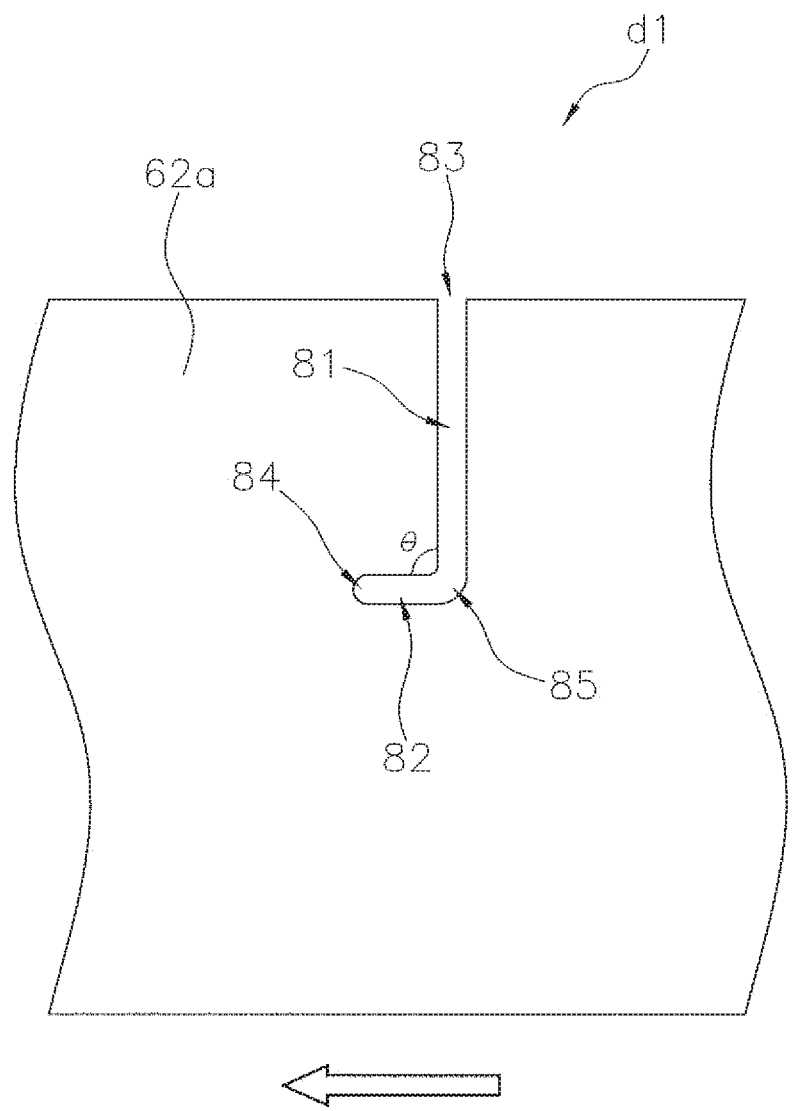
FIG. 9 is an enlarged view of the vicinity of a winding groove of FIG. 8.

FIG. 7 is a top view of the insulator 62 attached to the upper-end surface 61a of the stator coil 61. FIG. 8 is a side view of the insulator 62 shown in FIG. 7. FIG. 8 is a panoramic development view of the insulator 62 shown in FIG. 7, seen from the outside toward the center. In FIG. 8, the left end of the insulator 62 is connected to the right end of the insulator 62. As described below, the insulator 62 has nine winding grooves d1 to d9. FIG. 9 is an enlarged view in the vicinity of the winding groove d1 in FIG. 8. In FIG. 7 to FIG. 9, the direction in which the windings 73 are wound (the winding direction) is indicated by the outlined arrows. The direction in which the windings 73 are wound is a circumferential direction of the stator core 61.

The insulator 62 has an annular part 62a and nine protruding parts 62b, as shown in 7. The annular part 62a is in contact with the upper-end surface of the cylindrical part 71 of the stator core 61. The protruding parts 62b protrude from an inner peripheral surface of the annular part 62a radially inward from the annular part 62a. The protruding parts 62b are in contact with the upper-end surface of the teeth 72 of the stator core 61.

As shown in FIG. 8, the nine winding grooves d1 to d9 are formed in the annular part 62a of the insulator 62. The number of the winding grooves d1 to d9 is the same as the number of the protruding parts 62b. The winding grooves d1 to d9 are L-shape grooves. Each of the winding grooves d1 to d9 is a groove to catch and support the neutral line c1 to c9. The winding grooves d1 to d9 support the neutral lines c1 to c9 of the windings 73 that are wound on the teeth 72 in the vicinity thereof. Next, the configuration of the winding groove d1 is described, referring to FIG. 9. The following description is also applicable to the winding grooves d2 to d9.

The winding groove d1 is principally configured from a first space 81 and a second space 82. The first space 81 and the second space 82 communicate via a bent part 85. The first space 81 includes an opening 83. The opening 83 is an inlet of the winding groove d1, and is formed on the upper-end surface of the annular part 62a. The opening 83 is formed on the end surface in the vertical direction of the annual part 62a of the insulator 62, which is the end surface not in contact with the stator core 61. The first space 81 extends in the vertical direction from the opening 83. The second space 82 extends in a horizontal direction. The second space 82 includes a tip part 84. As described below, the tip part 84 is a portion for catching the neutral lines c1 to c9 of the windings 73. The tip part 84 is positioned on the side of the bent part 85 in the direction of winding of the winding 73. That is, as shown in FIG. 9, the tip part 84 is positioned on the left side of the bent part 85 when the insulator 62 is seen from the outside. As shown in FIG. 9, the angle between the first space 81 and the second space 82 is called a bending angle θ. The second space 82 extends in a horizontal direction, and therefore the bending angle θ is 90°.

Next, the position of the winding groove d1 in the circumferential direction of the annular part 62a is described. The following description is also applicable to winding grooves d2 to d9. In the following, the position of the winding groove d1 is the position at which the opening 83 of the winding groove d1 is formed. As shown in FIG. 7 and FIG. 8, the winding groove d1 is positioned in a region R between a tooth center position P1 and a adjacent slot center position P2 in the circumferential direction of the annular part 62a. The tooth center position P1 is the center position in the circumferential direction of the tooth 72. The adjacent slot center position P2 is the center position in the circumferential direction of the space between the tooth 72 in which the tooth center position P1 is located and the tooth 72 adjacent to the tooth 72 in the direction opposite to the direction in which the windings 73 are wound. In the case of the winding groove d1, the tooth center position P1 is the center position in the circumferential direction of the tooth 72 of the coil U1, and the adjacent slot center position P2 is the center position in the circumferential direction of the slot SL9 between the tooth 72 of the coil U1 and the tooth 72 of the coil V3.

The neutral lines c1 to c9 of the windings 73 pass through the second spaces 82 of the respective winding grooves d1 to d9. The feeder lines e1 to d9 of the windings 73 pass through the first spaces 81 of the respective winding grooves d1 to d9.

(2-2) Rotor

The rotor 52 is linked to the crankshaft 17. The crankshaft 17 passes through the rotational center of the rotor 52 vertically. The rotor 52 rotates about the rotational axis of the crankshaft 17. The rotor 52 is connected with the compression mechanism 15 via the crankshaft 17.

The rotor 52 principally has a rotor core 52a and a plurality of magnets 52b, as shown in FIG. 1. The rotor core 52a is configured from a plurality of vertically stacked metal plates. The magnets 52b are buried in the rotor core 52a. The magnets 52b are arranged at equal intervals along the circumferential direction of the rotor core 52a.

(3) Operation of Compressor

Driving of the motor 16 causes the rotor 52 to rotate and the crankshaft 17 to axially rotate. Due to axial rotation of the crankshaft 17, the piston 21 of the compressor mechanism 15 performs an orbiting motion in the compression chamber 40 about the rotational axis of the crankshaft 17. The orbiting motion of the piston 21 causes the volumes of the intake chamber and discharge chamber constituting the compression chamber 40 to vary. A low-pressure gas refrigerant is thereby taken into the intake chamber of the compression chamber 40 from the intake tube 19. The volume of the intake chamber is reduced by the orbiting motion of the piston 21; as a result, the refrigerant is compressed, and the intake chamber becomes a discharge chamber. The compressed, high-pressure gas refrigerant is discharged from the discharge chamber into the high-pressure space S1. The discharged compressed refrigerant passes vertically upward through the air gap, which is the space between the stator 51 and the rotor 52. The compressed refrigerant is then discharged outside the casing 10 from the discharge tube 20. The refrigerant compressed by the rotary compressor 101 is, e.g., R410A, R22, R32, and carbon dioxide.

The lubricating oil, stored in the oil storage part 10a at the bottom of the casing 10, is supplied to sliding parts of the compression mechanism 15 and the like. The lubricating oil that is supplied to the sliding parts of the compression mechanism 15 flows into the compression chamber 40. In the compression chamber 40, the lubricating oil is formed into fine oil droplets that are mixed into the refrigerant gas. Therefore, the compressed refrigerant discharged from the compression mechanism 15 includes the lubricating oil. Some of the lubricating oil included in the compressed refrigerant separates from the refrigerant due to centrifugal force or the like caused by the flow of the refrigerant in the high-pressure space S1 above the motor 16, and adheres to the inner peripheral surface of the casing 10. The lubricating oil that has adhered to the inner peripheral surface of the casing 10 descends along the inner peripheral surface of the casing 10, and reaches a position at the height of the upper surface of the stator 51 of the motor 16. The lubricating oil then descends through the core cuts 71a of the stator core 61. The lubricating oil that has passed through the core cuts 71a finally returns to the oil storage part 10a.

(4) Characteristics

The stator 51 of the motor 16 has nine coils, U1, U2, U3; V1, V2, V3; W1, W2, W3. The coils U1, U2, U3; V1, V2, V3; W1, W2, W3 are concentrated-winding coils that are formed by winding the windings 73 around each of the teeth 72 of the stator core 61. In order to improve the efficiency of the motor 16, in the concentrated-winding coils the windings 73 are wound around the teeth 72 so as to raise the winding space factor, which is the fraction of the cross-sectional area of the coils U1, U2, U3; V1, V2, V3; W1, W2, W3 occupied by the cross-sectional area of the windings 73.

Figure 10:
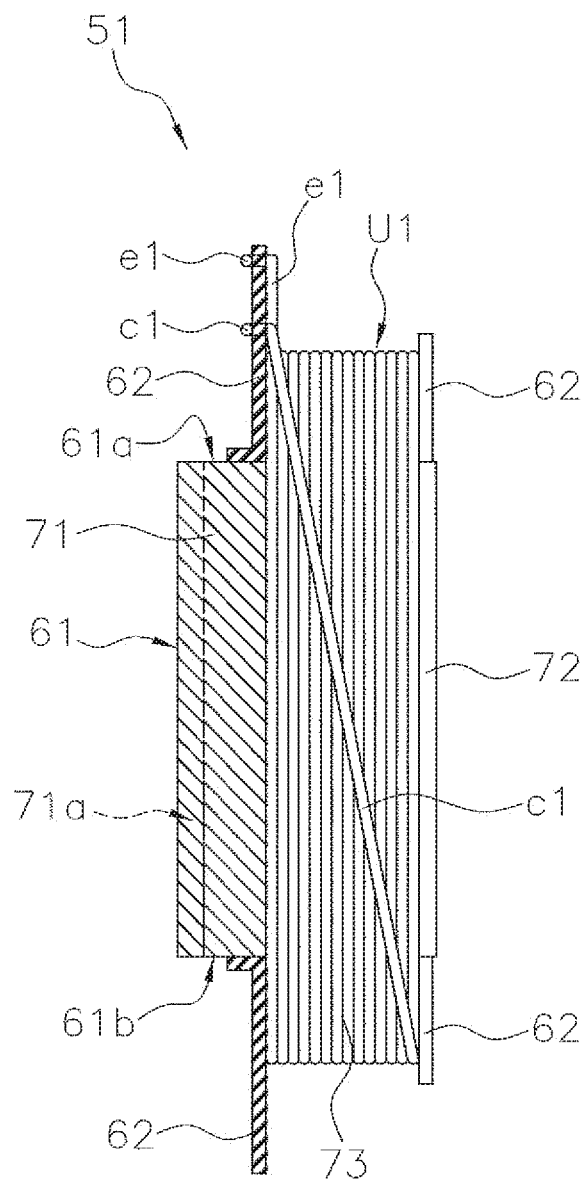
FIG. 10 is a side view of the coil of FIG. 3, seen from the direction of arrow X.

FIG. 10 is a side view of the coil L11 seen from the direction of the arrows X in FIG. 3. In FIG. 10, the left side is the radially outer side of the stator core 61, and the right side is the radially inner side of the stator core 61. In order to raise the winding space factor, as shown in FIG. 10, the winding 73 is wound around the tooth 72 such that the feeder line e1, which is the winding starting portion of the winding 73, exits from the farthest radially outer side of the stator core 61, and moreover such that the neutral line c1, which is the winding finishing portion of the winding 73, exits from the farthest radially inner side of the stator core 61. In this case, the feeder line e1 extends from the winding 73 in the innermost part of the coil U1, and therefore is secured by the coil U1. On the other hand, the neutral line c1 extends from the winding 73 in the radially outermost part of the coil U1, and therefore is not secured by the coil U1. But the neutral line c1 passes through the second space 82 of the winding groove d1 that is positioned in the vicinity of the coil U1. As a result, the neutral line c1 is supported by the winding groove d1 so as not to come loose from the winding groove d1, and therefore loosening of the neutral line c1 and coming-apart of the coil U1 is prevented. The feeder line e1 passes through the first space 81 of the winding groove d1, but is not supported by the winding groove d1. The above description is also applicable to the other coils U2, U3; V1, V2, V3; W1, W2, W3. That is, the neutral lines c2 to c9 are supported by the winding grooves d2 to d9 respectively, and therefore loosening of the neutral lines c2 to c9 and coming-loose of the coils U2, U3; V1, V2, V3; W1, W2, W3, is prevented.

Next, a method for manufacturing the stator 51 is described. As one example of the method for manufacturing the stator 51, a simultaneous-winding method is adopted in which a winding nozzle (not shown) that expels the winding 73 is used to simultaneously wind the windings 73 around all the teeth 72. In the simultaneous-winding method, in a state in which the stator core 61 is secured with the insulator 62 installed thereupon, nine winding nozzles are moved on the periphery of the nine teeth 72 to simultaneously wind the windings 73 around all of the teeth 72.

The nine windings 73 that are wound around the nine teeth 72 have the feeder lines e1 to e9 respectively, which are winding starting portions, and the neutral lines c1 to c9, which are winding finishing portions. After the windings 73 are simultaneously wound around all of the teeth 72, the nine feeder lines e1 to e9 and the nine neutral lines c1 to c9 are in a state of jutting-out from the coils U1, U2, U3; V1, V2, V3; W2, W3 on the side of the upper-end surface 61a of the stator core 61. At this time, the nine feeder lines e1 to e9 and the nine neutral lines c1 to c9 are not secured. In the simultaneous-winding method, the windings 73 are wound around the teeth 72 such that the neutral lines c1 to c9 exit from the innermost side of the teeth 72 in the radial direction.

Figure 11:
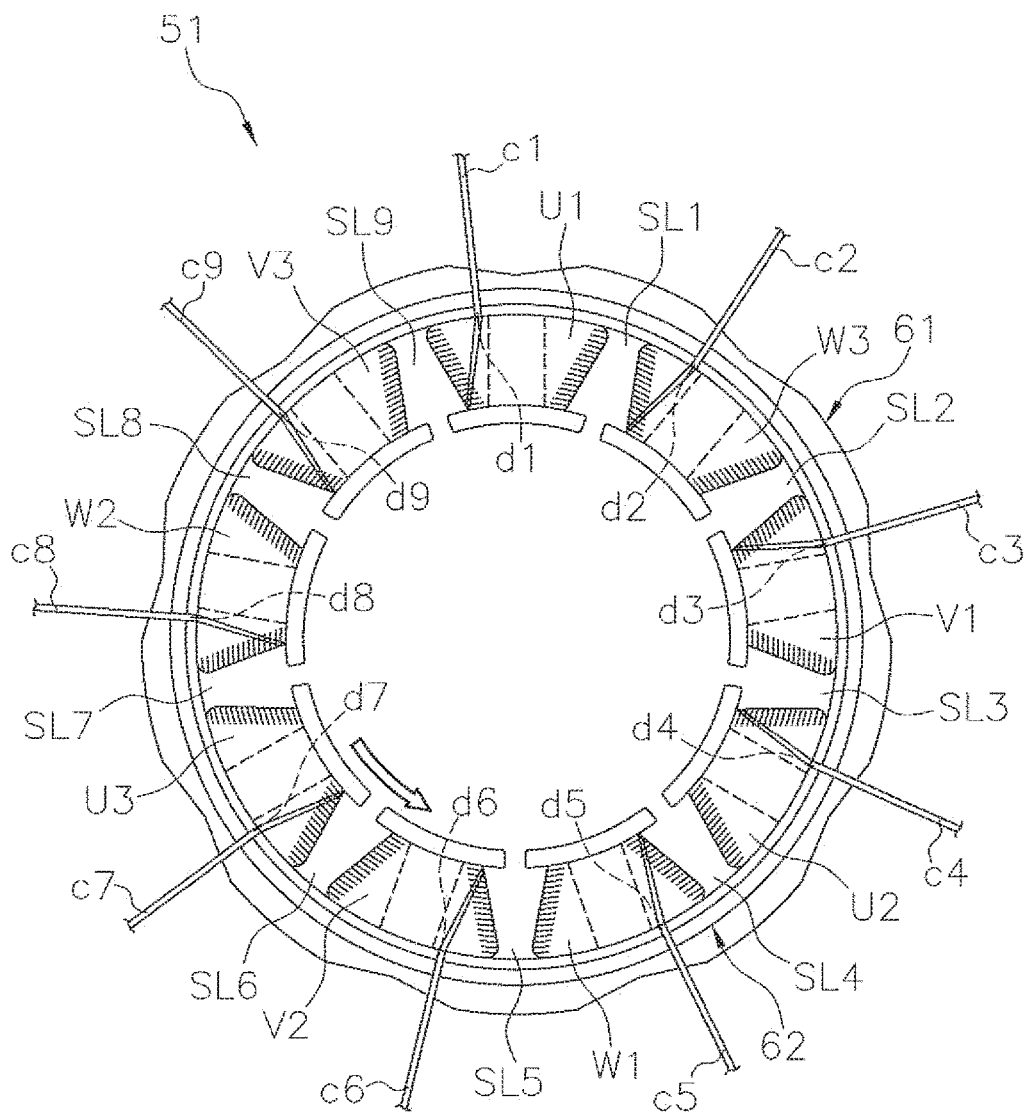
FIG. 11 shows a state in which, facing the outside in the radial direction of the stator, windings are caught.

Next, a process is performed in which the neutral lines c1 to c9 are caught in the winding grooves d1 to d9 of the insulator 62 respectively. Specifically, first, the winding nozzles are moved and the neutral lines c1 to c9 are inserted from the openings 83 of the respective winding grooves d1 to d9. Next, the winding nozzles are moved, and the neutral lines c1 to c9 are inserted up to the bent parts 85 of the winding grooves d1 to d9. Next, the winding nozzles are moved toward the outside of the stator core 61 in the radial direction, and the neutral lines c1 to c9 are put into a state of being caught facing the outside of the stator core 61 in the radial direction. FIG. 11 indicates the state of the stator 51 at this time. In FIG. 11, the nine neutral lines c1 to c9 pass through the bent parts 85 of the respective winding grooves d1 to d9, and are caught facing the outside of the stator core 61 in the radial direction. Next, without moving the winding nozzles, the stator 51 is rotated about the rotational axis along the direction of the outlined arrow shown in FIG. 11. As a result, the neutral lines c1 to c9 are inserted up to the tip parts 84 of the respective winding grooves d1 to d9. Through the above processes, the neutral lines c1 to c9 are caught in the respective winding grooves d1 to d9.

Then, connection processes for the feeder lines e1 to e9 and the neutral lines c1 to c9 are performed. Specifically, the nine feeder lines e1 to e9 are connected to the three feeder terminals U, V, W, and the nine neutral lines c1 to c9 are connected to the neutral point 74. The connection processes are performed manually. After the connection processes, the feeder lines e1 to e9 are inserted into the respective winding grooves d1 to d9.

In the present embodiment, when a worker connects the feeder lines e1 to e9 and the neutral lines c1 to c9, the neutral lines c1 to c9 are caught in the respective winding grooves d1 to d9 and supported by the insulator 62. At this time, the feeder lines e1 to e9 are not supported by the insulator 62. Hence, the worker who connects the feeder lines e1 to e9 and the neutral lines c1 to c9 can easily distinguish the feeder lines e1 to e9 and the neutral lines c1 to c9. Therefore, in the steps for manufacturing the stator 51, the occurrence of erroneous connection of the feeder lines e1 to e9 and the neutral lines c1 to c9 of the windings 73 is prevented, and moreover a decline in productivity of the motors 16 provided with the stator 51, arising due to connection defects in the windings 73, is suppressed.

Further, in the present embodiment, after simultaneously winding the windings 73 around all the teeth 72 in the step for manufacturing the stator 51, the neutral lines c1 to c9 that are the winding finishing portions of the windings 73 can be caught on and secured to the winding grooves d1 to d9 of the insulator 62. This prevents the neutral lines c1 to c9 from loosening and the coils U1, U2, U3; V1, V2, V3; W1, W2, W3 from coming apart; therefore, the windings 73 can be wound around the teeth 72 until the farthest radially inner side of the stator core 61. Hence, in a step for manufacturing the stator 51, the windings 73 can be wound around the teeth 72 so as to raise the winding space factor, and therefore the efficiency of the motor 16 provided with the stator 51 is improved. Further, in the step for manufacturing the stator 51, the occurrence of manufacturing defects in the motor 16 arising from coming-off of the neutral lines c1 to c9, which are the winding finishing portions of the windings 73, from the coils U1, U2, U3; V1, V2, V3; W1, W2, W3, is suppressed.

(5) Modifications (5-1) Modification A

In the embodiment, the winding grooves d1 to d9 are L-shape grooves, as shown in FIG. 9. The winding grooves d1 to d9 have the first space 81 and the second space 82. The bending angle θ, which is the angle between the first space 81 and the second space 82, is 90° However, the bending angle θ may be less than 90°.

Figure 12:
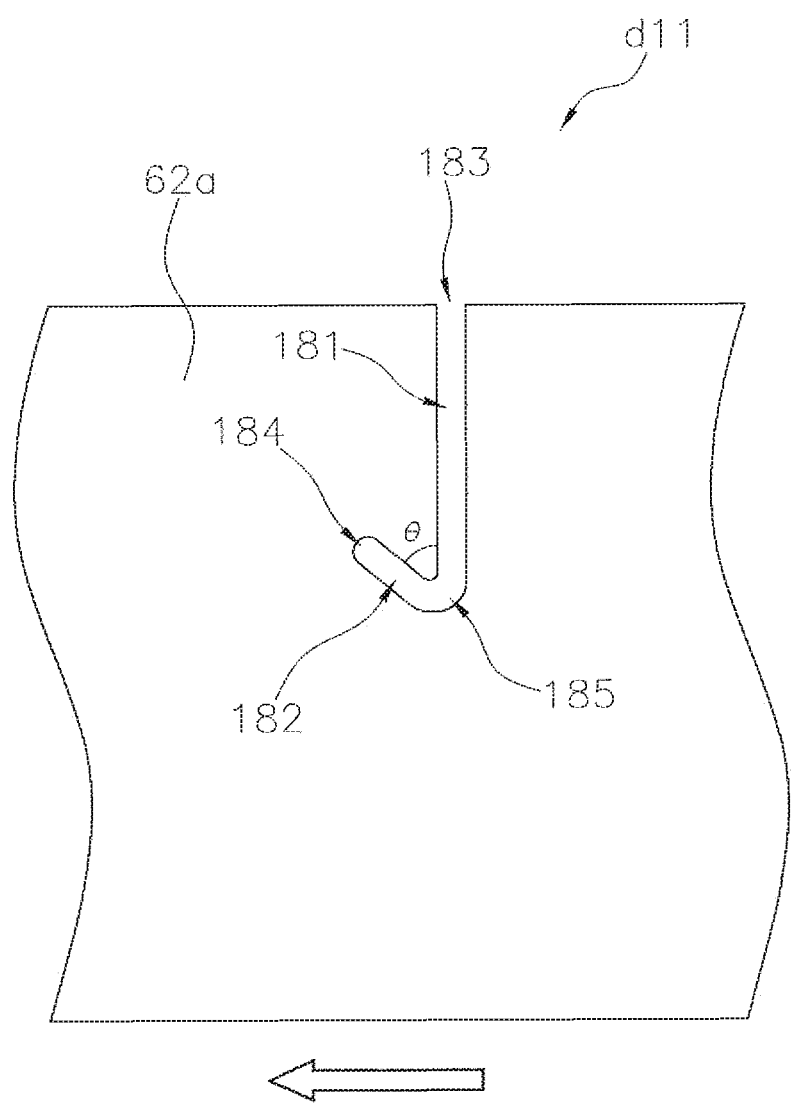
FIG. 12 is an enlarged view in the vicinity of a winding groove according to Modification A.

FIG. 12 is an example of a winding groove d11 according to the present modification. In FIG. 12, the direction in which the winding 73 is wound is shown by the outlined arrow. The winding groove d11, similarly to the winding grooves d1 to d9 of the embodiment, is formed in the annular part 62a of the insulator 62 that is installed on the upper-end surface 61a of the stator core 61. The winding groove d11 is principally configured from a first space 181 and a second space 182. The first space 181 and the second space 182 communicate via a bent part 185. The first space 181 includes an opening 183. The opening 183 is an inlet of the winding groove d11, and is formed on the upper-end surface of the annular part 62a. The first space 181 extends in the vertical direction from the opening 183. The second space 182 includes a tip part 184. The tip part 184 is positioned on the side in the direction in which the winding 73 is wound relative to the bent part 185. That is, when seen from outside the insulator 62, the tip part 184 is positioned on the left side of the bent part 185. The second space 182 is inclined upward in the vertical direction from the direction of winding of the winding 73. That is, the bending angle θ, which is the angle between the first space 181 and the second space 182, is smaller than 90°.

In the winding groove d11 of the present modification, the tip part 184 is positioned higher in the vertical direction than the bent part 185. Hence in the process of catching the neutral lines c1 to c9, which are the winding finishing portions of the windings 73, in the winding grooves d11, the neutral lines c1 to c9 that have been inserted up to the tip parts 184 of the winding groove d11 do not readily come loose from the opening 183 via the bent part 185. Hence in the step for manufacturing the stator 51, the occurrence of manufacturing defects in the motor 16 arising from coming-off from the coils U1, U2, U3; V1, V2, V3; W1, W2, W3 of the neutral lines c1 to c9 that are the winding finishing portions of the windings 73, is more effectively suppressed.

(5-2) Modification B

In the embodiment, the winding grooves d2 to d9 are L-shape grooves, as shown in FIG. 9. The winding grooves d2 to d9 have the first space 81 and the second space 82. The distance between the tip part 84 of the second space 82 and the upper-end surface 61a of the stator core 61 is the same as the minimum distance between the winding grooves d1 to d9 and the upper-end surface 61a of the stator core 61. However, if the distance between the tip part 84 and the upper-end surface 61a of the stator core 61 is greater than the minimum distance between the winding grooves d1 to d9 and the upper-end surface 61a of the stator core 61, then the winding grooves d1 to d9 may have other shapes.

Figure 13:
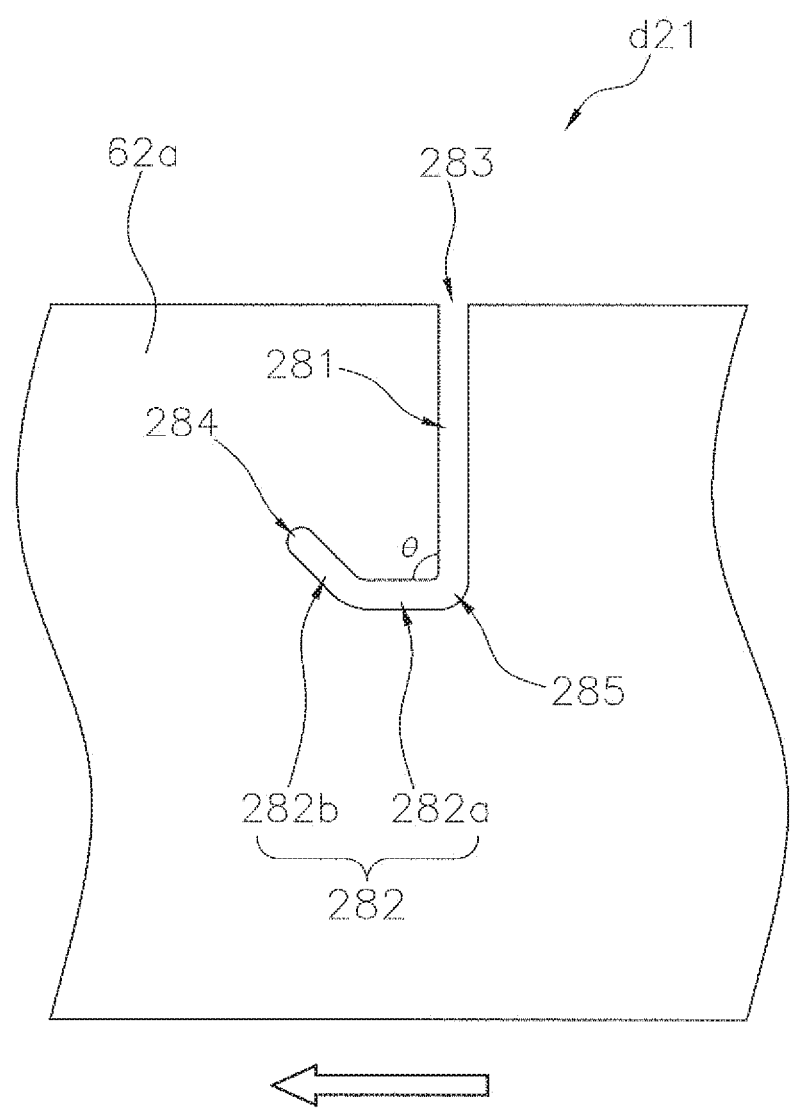
FIG. 13 is an enlarged view in the vicinity of a winding groove according to Modification B.

FIG. 13 shows one example of a winding groove d21 according to the present modification. In FIG. 13, the direction of winding of the windings 73 is shown by the outlined arrow. The winding groove d21, similarly to the winding grooves d1 to d9 of the embodiment, is formed in the annular part 62a of the insulator 62 which is installed on the upper-end surface 61a of the stator core 61. The winding groove d21 is principally configured from a first space 281 and a second space 282. The first space 281 and the second space 282 communicate via a bent part 285. The first space 281 includes an opening 283. The opening 283 is an inlet of the winding groove d21, and is formed on the upper-end surface of the annular part 62a. The first space 281 extends in the vertical direction from the opening 283. The second space 282 includes a tip part 284. The tip part 284 is positioned on the side in the direction in which the winding 73 is wound relative to the bent part 285. That is, when seen from outside the insulator 62, the tip part 284 is positioned on the left side of the bent part 285. The second space 282 has a horizontal part 282a that extends from the bent part 285 in a horizontal direction, and an inclined part 282b that extends from the horizontal part 282a upward in the vertical direction toward the tip part 284. Hence, the distance between the tip part 284 and the stator core 61 is greater than the minimum distance between the winding groove d11 and the stator core 61. The minimum distance is the distance between the bent part 285 and the stator core 61. The bending angle θ, which is the angle between the first space 281 and the second space 282, is 90°.

In the winding groove d21 of the present modification, the tip part 284 is positioned further upward in the vertical direction than the bent part 285. Hence in the process of catching the neutral lines c1 to c9, which are the winding finishing portions of the windings 73, in the winding grooves d21, the neutral lines c1 to c9 that have been inserted up to the tip parts 284 of the winding groove d21 do not readily come loose from the opening 283 via the bent part 285. Hence in the step for manufacturing the stator 51, the occurrence of manufacturing defects in the motor 16 arising from coming off from the coils U1, U2, U3; V1, V2, V3; W1, W2, W3 of the neutral lines c1 to c9 that are the winding finishing portions of the windings 73 is more effectively suppressed.

In the present modification, if the tip part 284 is positioned further upward in the vertical direction than the bent part 285, then the second space 282 may have other shapes.

(5-3) Modification C

In the embodiment, the winding grooves d1 to d9 are L-shape grooves, as shown in FIG. 9. The winding grooves d1 to d9 have the first space 81 and the second space 82. The second space 82 is positioned on the side in the direction in which the winding 73 is wound relative to the bent part 85. However, the second part 82 may include a space that is positioned on the opposite side to the direction in which the winding 73 is wound relative to the bent part 85.

Figure 14:
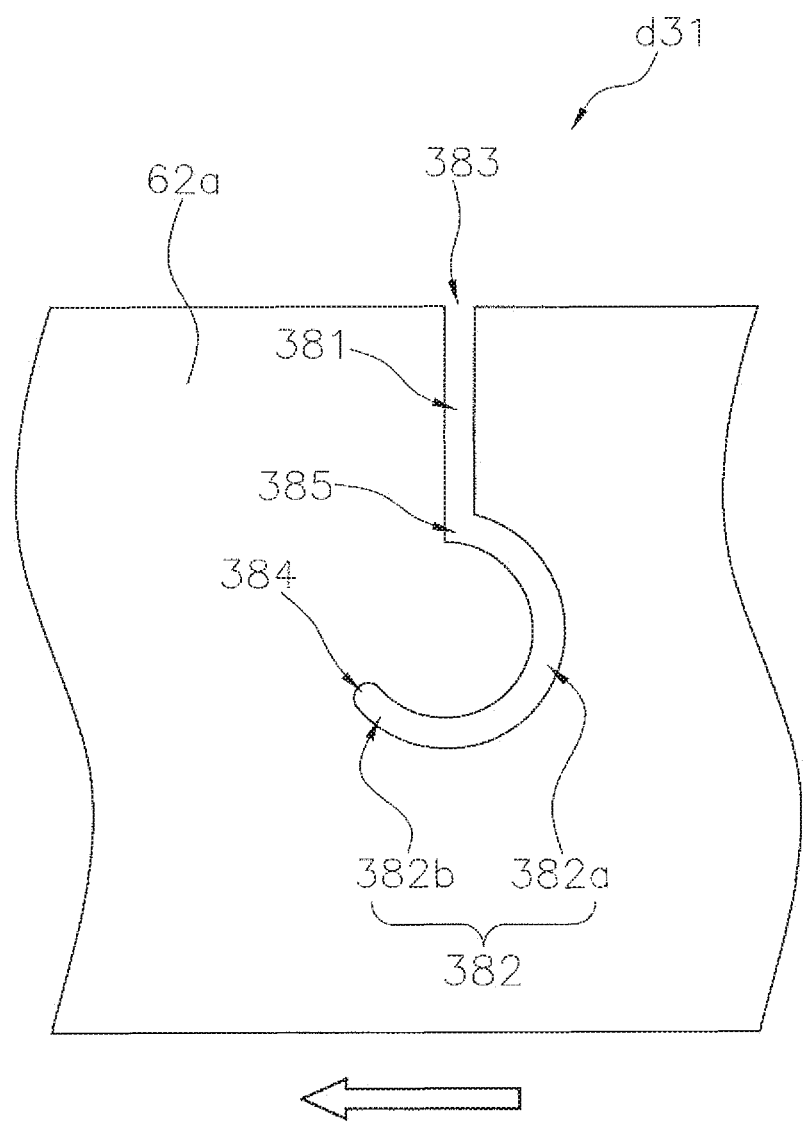
FIG. 14 is an enlarged view in the vicinity of a winding groove according to Modification C.

FIG. 14 shows one example of a winding groove d31 according to the present modification. In FIG. 14, the direction of winding of the windings 73 is indicated by the outlined arrow. The winding groove d31, similarly to the winding grooves d1 to d9 of the embodiment, is formed in the annular part 62a of the insulator 62 which is installed on the upper-end surface 61a of the stator core 61. The winding groove d31 is principally configured from a first space 381 and a second space 382. The first space 381 and the second space 382 communicate via a bent part 385. The first space 381 includes an opening 383. The opening 383 is an inlet of the winding groove d31, and is formed on the upper-end surface of the annular part 62a. The first space 381 extends in the vertical direction from the opening 383. The second space 382 includes a tip part 384. The tip part 384 is positioned on the side in the direction in which the winding 73 is wound relative to the bent part 385. That is, when seen from outside the insulator 62, the tip part 384 is positioned on the left side of the bent part 385.

In the winding groove d31, the second space 382 has a return space 382a and a reversal space 382b. The return space 382a is a space that is positioned on the side in the direction in which the winding 73 is wound relative to the bent part 385. The reversal space 382b is a space that is positioned on the side in the direction in which the winding 73 is wound relative to the bent part 385. The reversal space 382b includes a tip part 384. The distance between the tip part 384 and the stator core 61 is greater than the minimum distance between the winding groove d31 and the stator core 61. The minimum distance is the distance between the point of the second space 382 that is lowest in the vertical direction, and the stator core 61.

In the winding groove d31 of the present modification, the second space 382 has the return space 382a. Hence, in the step in which the neutral lines c1 to c9, which are the winding finishing portions of the windings 73, are caught on the winding groove d31, the neutral lines c1 to c9 that have been inserted up to the tip parts 384 of the winding grooves 321 do not readily come loose from the openings 383 via the return spaces 382a. Hence in the step for manufacturing the stator 51, the occurrence of manufacturing defects in the motor 16 arising from coming off from the coils U1, U2, U3; V1, V2, V3; W1, W2, W3 of the neutral lines c1 to c9 that are the winding finishing portions of the windings 73 is more effectively suppressed.

(5-4) Modification D

In the embodiment, the winding grooves d1 to d9 are L-shape grooves, as shown in FIG. 9. The first spaces 81 of the winding grooves d1 to d9 extend in the vertical direction. However, the first spaces 81 may extend so as to be inclined with respect to the vertical direction. Further, in Modifications A to C also, the first spaces 181, 281, 381 may extend so as to be inclined with respect to the vertical direction.

(5-5) Modification E

In the embodiment, the insulator 62 that is installed on the upper-end surface 61a of the stator core 61 has winding grooves d1 to d9, but the insulator 62 that is installed on the lower-end surface 61b of the stator core 61 does not have winding grooves d1 to d9. However, instead of the insulator 62 that is installed on the upper-end surface 61a of the stator core 61, the insulator 62 that is installed on the lower-end surface 61b of the stator core 61 may have the winding grooves d1 to d9.

In the present modification, in the step for manufacturing the stator 51, the neutral lines c1 to c9 of the windings 73 can be made to exit from the lower-end surface 61b of the stator core 61 and can be secured to the respective winding grooves d1 to d9 of the insulator 62.

(5-6) Modification F

In the embodiment, the rotary compressor 101 is used as a compressor provided with the stator 51 having the insulator 62 in which are formed the winding grooves d1 to d9, but a scroll compressor or another compressor may be used.

INDUSTRIAL APPLICABILITY

A stator and motor according to the present invention enable easy identification of the winding starting ends and the winding finishing ends of windings that are wound around teeth, and can prevent the incidence of erroneous connections.

What is claimed is:
1. A stator comprising:
 a cylindrical stator core; and
 an insulator installed on an axial-direction end surface of the stator core, the stator core having
  a cylindrical part,
  a plurality of teeth protruding from an inner circumferential surface of the cylindrical part toward a radially inner side of the cylindrical part, and disposed along a circumferential direction of the cylindrical part, and
  a plurality of windings wound around the plurality of teeth, respectively, each winding having
    a first end that is a winding start part around a respective tooth of the plurality of teeth, and
    a second end that is a winding end part around the respective tooth,
the insulator having a plurality of winding grooves configured to support the second ends of the plurality of windings,
each of the winding grooves supporting the second end of a single one of the plurality of windings such that each of the second ends is individually supported in one of the winding grooves, with each winding groove having
  a first space including an opening, and
  a second space including a tip part configured to catch the second end of one of the plurality of windings, and communicating with the first space via a bent part,
  the opening being formed on an axial-direction end surface of the insulator that is not in contact with the stator core,
the windings being wound around the teeth such that the second ends exit from radially inner sides of the teeth, and
a number of the winding grooves being equal to a number of the second ends.

2. The stator according to claim 1, wherein
each of the first spaces extends from one of the openings along an axial direction of the insulator.

3. The stator according to claim 2, wherein
the tip part of each groove is positioned on a winding direction side relative to the bent part.

4. The stator according to claim 2, wherein
the second space of each groove is positioned on the winding direction side relative to the bent part, and
the bent part of each groove connects the first space to the second space at a bending angle of 90° or less.

5. The stator according to claim 2, wherein
the second space of each groove further includes a return space positioned on an opposite side along the winding direction side relative to the bent part.

6. The stator according to claim 2, wherein
the opening of each groove is circumferentially positioned between
  a tooth center position of one tooth of the plurality of teeth and
  an adjacent slot center position of one adjacent slot of a plurality of slots circumferentially disposed between the plurality of teeth,
each tooth center position is centered along the circumferential direction of the tooth, and
each adjacent slot center position is centered along the circumferential direction of the adjacent slot which is disposed in a direction opposite to the winding direction.

7. The stator according to claim 2, wherein
a distance between the tip part of each winding groove and the stator core is greater than a minimum distance between the winding groove and the stator core.

8. The stator according to claim 2, wherein
the second end of each winding is connected to a neutral point.

9. The stator according to claim 1, wherein
the tip part of each groove is positioned on a winding direction side relative to the bent part.

10. The stator according to claim 9, wherein
the second space of each groove is positioned on the winding direction side relative to the bent part, and
the bent part of each groove connects the first space to the second space at a bending angle of 90° or less.

11. The stator according to claim 9, wherein
the second space of each groove further includes a return space positioned on an opposite side along the winding direction side relative to the bent part.

12. The stator according to claim 9, wherein
the opening of each groove is circumferentially positioned between
  a tooth center position of one tooth of the plurality of teeth and
  an adjacent slot center position of one adjacent slot of a plurality of slots circumferentially disposed between the plurality of teeth,
each tooth center position is centered along the circumferential direction of the tooth, and
each adjacent slot center position is centered along the circumferential direction of the adjacent slot which is disposed in a direction opposite to the winding direction.

13. The stator according to claim 9, wherein
a distance between the tip part of each winding groove and the stator core is greater than a minimum distance between the winding groove and the stator core.

14. The stator according to claim 1, wherein
the second space of each groove is positioned on the winding direction side relative to the bent part, and
the bent part of each groove connects the first space to the second space at a bending angle of 90° or less.

15. The stator according to claim 1, wherein
the second space of each groove further includes a return space positioned on an opposite side along the winding direction side relative to the bent part.

16. The stator according to claim 1, wherein
the opening of each groove is circumferentially positioned between
  a tooth center position of one tooth of the plurality of teeth and
  an adjacent slot center position of one adjacent slot of a plurality of slots circumferentially disposed between the plurality of teeth,
each tooth center position is centered along the circumferential direction of the tooth, and
each adjacent slot center position is centered along the circumferential direction of the adjacent slot which is disposed in a direction opposite to the winding direction.

17. The stator according to claim 1, wherein
a distance between the tip part of each winding groove and the stator core is greater than a minimum distance between the winding groove and the stator core.

18. The stator according to claim 1, wherein
the second end of each winding is connected to a neutral point.

19. A motor including the stator according to claim 1, the motor further comprising
a rotor disposed inside of the stator.

20. A method of manufacturing a stator including a cylindrical stator core and an insulator installed on an axial-direction end surface of the stator core, the method comprising:
- a winding step in which a plurality of windings are simultaneously wound around a plurality of teeth of the stator core;
- a catching step in which a second end of each winding, which is a winding end part around a respective tooth of the plurality of teeth, is caught in a tip part of a winding groove of a plurality of winding grooves of the insulator and supported; and
- a connecting step in which a first end of each winding, which is a winding start part around the respective tooth, is connected, and the second ends are connected,
- the plurality of teeth protruding from an inner circumferential surface of a cylindrical part of the stator core toward a radially inner side of the cylindrical part, and being disposed along a circumferential direction of the cylindrical part,
- each of the winding grooves supporting the second end of a single one of the windings wound around each of the plurality of teeth such that each of the second ends is individually supported in one of the winding grooves, each winding groove having
  - a first space including an opening; and
  - a second space including the tip part, and communicating with the first space via a bent part,
- the opening being formed on an axial-direction end surface of the insulator that is not in contact with the stator core,
- the windings being wound around the teeth such that the second ends exit from radially inner sides of the teeth, and
- a number of the winding grooves being equal to a number of the second ends.

* * * * *